(12) United States Patent
Shi (10) Patent No.: US 10,146,345 B2
(45) Date of Patent: Dec. 4, 2018

(54) ELECTRONIC DEVICE HAVING A TRACK DETECTION UNIT, AND METHOD OF OPERATING THE SAME

(71) Applicant: Lenovo (Beijing) Limited, Beijing (CN)

(72) Inventor: Bin Shi, Beijing (CN)

(73) Assignee: LENOVO (BEIJING) LIMITED, Beijing (CN)

(*) Notice: Subject to any disclaimer, the term of this patent is extended or adjusted under 35 U.S.C. 154(b) by 0 days.

(21) Appl. No.: 15/182,998

(22) Filed: Jun. 15, 2016

(65) Prior Publication Data

US 2016/0364035 A1 Dec. 15, 2016

(30) Foreign Application Priority Data

Jun. 15, 2015 (CN) .......................... 2015 1 0330709

(51) Int. Cl.
*G06F 3/041* (2006.01)
*G06F 1/32* (2006.01)
*G06F 3/0354* (2013.01)

(52) U.S. Cl.
CPC ............ *G06F 3/041* (2013.01); *G06F 1/3206* (2013.01); *G06F 1/3231* (2013.01);
(Continued)

(58) Field of Classification Search
CPC .... G06F 3/033; G06F 3/0354; G06F 3/03545; G06F 3/03546; G06F 3/041–3/0414; G06F 3/043–3/047; G06F 3/048; G06F 3/0484; G06F 3/0487–3/04883; G06F 3/0416; G06F 1/3206; G06F 1/3212;
(Continued)

(56) References Cited

U.S. PATENT DOCUMENTS 8,773,405 B1* 7/2014 Ryshtun .............. G06F 3/03545
345/179
2005/0044448 A1* 2/2005 Verdun ................. G06F 1/3225
714/22

(Continued)

FOREIGN PATENT DOCUMENTS

| CN | 202102266 U | 1/2012 |
| CN | 103927018 A | 7/2014 |
| JP | 2014135021 A | 7/2014 |

OTHER PUBLICATIONS

"First Office Action for Application No. 201510330709.2" The State Intellectual Property Office of People's Republic of China, dated Jul. 3, 2017, 10 pages.

*Primary Examiner* — Nathan Danielsen
(74) *Attorney, Agent, or Firm* — Kunzler, PC (57) ABSTRACT

An electronic device and a method for user track input detection are disclosed. One electronic device includes a processor having a first state and a second state. The processor consumes more power in the first state than in the second state. The electronic device also includes a track detection unit that detects a user track input. Operational information of the track detection unit is determined as the track detection unit detects the user track input, and, in response to the determined operational information of the track detection unit satisfying a predetermined condition, the processor switches from operating in the second state to operating in the first state.

16 Claims, 7 Drawing Sheets

(52) U.S. Cl.
CPC ........ G06F 1/3243 (2013.01); G06F 3/03545 (2013.01); *G06F 3/0416* (2013.01); *Y02D 10/152* (2018.01); *Y02D 10/173* (2018.01)

(58) Field of Classification Search
CPC ...... G06F 1/3225; G06F 1/325; G06F 1/3243; G06F 1/3259–1/3265; Y02D 10/152; Y02D 10/17–10/174
See application file for complete search history.

(56) References Cited

U.S. PATENT DOCUMENTS

| | | | |
|---|---|---|---|
| 2013/0082937 A1* | 4/2013 | Liu | G06F 1/3262 345/173 |
| 2014/0049480 A1* | 2/2014 | Rabii | G06F 3/041 345/173 |
| 2014/0201549 A1 | 7/2014 | Nagasawa | |
| 2014/0282214 A1* | 9/2014 | Shirzadi | G06F 3/04883 715/781 |
| 2014/0333602 A1* | 11/2014 | Yang | G06F 1/3262 345/212 |

* cited by examiner

ELECTRONIC DEVICE HAVING A TRACK DETECTION UNIT, AND METHOD OF OPERATING THE SAME

FIELD

The subject matter disclosed herein relates to the field of information processing technology, and more specifically to an information processing method and electronic device.

BACKGROUND

With the development of science and technology, electronic devices have changed. In certain configurations, an electronic device may convert text directly or indirectly written on the electronic device by users to an electronic document. For example, after a user places a piece of paper onto an electronic device, and upon writing on the paper by means of a stylus, the processing system of the electronic device may recognize a user track input.

Specifically, a main processing unit of an electronic device may have a first state and a second state. The main processing unit may only be able to recognize a user's track input while in the first state. In certain configurations, power consumption of the main processing unit while in the first state may be higher than power consumption of the processing system while in the second state. For example, when the main processing unit is in the first state, the electronic device's display screen is on; conversely, when the main processing unit is in the second state, the electronic device is off.

Hence, the above-mentioned method for detecting user track input may result in excessive power consumption by the electronic device, and thereby shorten the standby time of the electronic device.

SUMMARY

One embodiment of the present disclosure includes an electronic device. The electronic device includes a processor having a first state and a second state. The processor consumes more power in the first state than in the second state. The electronic device also includes a track detection unit that detects a user track input. Operational information of the track detection unit is determined as the track detection unit detects the user track input, and, in response to the determined operational information of the track detection unit satisfying a predetermined condition, the processor switches from operating in the second state to operating in the first state.

Another embodiment of the present disclosure includes a method. The method includes detecting a user track input using a track detection unit. The method also includes determining operational information of the track detection unit as the track detection unit is detecting the user track input. The method includes, in response to the determined operating information of the track detection unit satisfying a predetermined condition, switching a processor from a second state to a first state, wherein the processor requires more power in the first state than in the second state.

One embodiment of the present disclosure includes an apparatus. The apparatus includes a processor having a first state and a second state. The processor consumes more power in the first state than in the second state. The apparatus also includes a track detection unit that detects a user input and stores the user input in a memory of the track detection unit. Operational information of the track detection unit is determined as the track detection unit detects the user input, and, in response to the determined operational information of the track detection unit satisfying a predetermined condition, the processor switches from operating in the second state to operating in the first state.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, embodiments will be described and explained with additional specificity and detail through the use of the accompanying drawings, in which.

DETAILED DESCRIPTION

The technical schemes in the embodiments of the present disclosure are described expressly and completely as follows with reference to the drawings in the embodiments of the present disclosure. It is noted that the embodiments described are not all, but rather only some of the embodiments. All other embodiments obtained by a person skilled in the art, based on the embodiments without creative work, will fall within the scope of protection of the present disclosure.

Embodiment 1 discloses an information processing method applied in an electronic device. The electronic device may be a mobile phone, a tablet computer, a PAD, or the like.

The electronic device includes at least a track detection unit and a main processing unit.

The main processing unit has at least a first state and a second state, and the power consumption of the main processing unit while in the second state is lower than the power consumption while in the first state.

For example, when the main processing unit is in the first state, the electronic device is in normal operation, and the display screen is on; and when the main processing unit is in the second state, the electronic device is off.

It should be noted that the track detection unit may be a small processing system such that the power consumption of the track detection unit while in the working state is much lower than the power consumption of the main processing unit while in the first state. Therefore, the detection of user track input is performed by the track detection unit, and, in the process of the track detection unit detecting user track input, the main processing unit may be in the second state.

The track detection unit is connected with the main processing unit. Specifically, the track detection unit can be implemented in many ways. For a specific implementation, FIG. 1 shows a structural schematic diagram of a system 10 having the track detection unit 100 and the main processing unit 200 disclosed in Embodiment 1.

Figure 1:
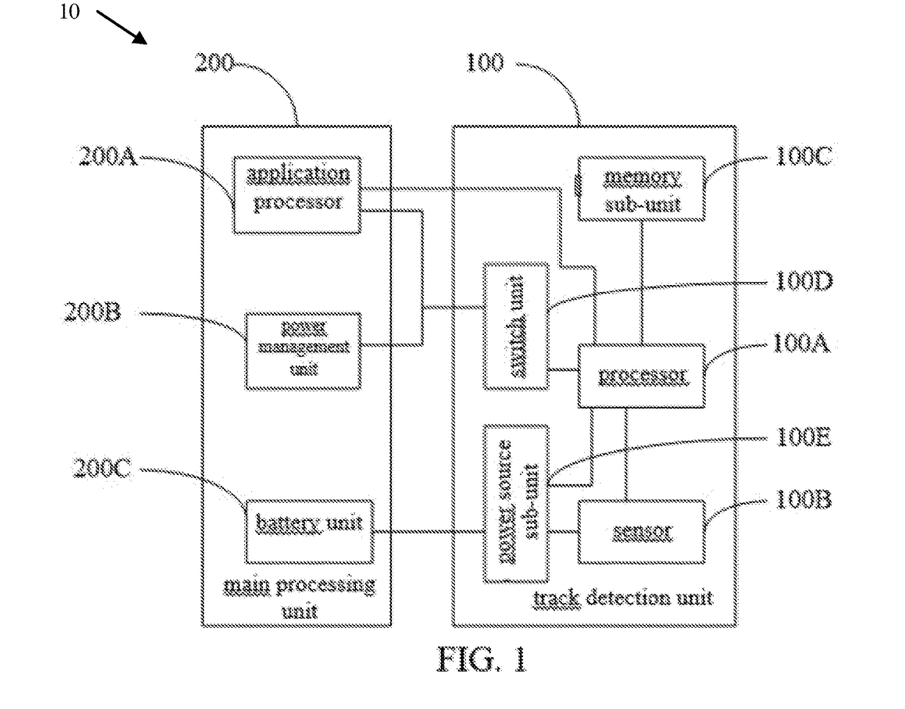
FIG. 1 is a structural schematic diagram of a system including a track detection unit connected with a main processing unit disclosed in Embodiment 1 of the present disclosure.

In conjunction with FIG. 1, it can be seen that the track detection unit 100 includes processor 100A, sensor 100B which is connected with the processor 100A, memory sub-unit 100C which is connected with the processor 100A, switch unit 100D which is connected with the processor 100A, and power source sub-unit 100E which is separately connected with the processor 100A and the sensor 100B.

Herein, the sensor 100B detects user track input, and the power source sub-unit 100E of the track detection unit 100 is configured for connecting with battery unit 200C of the main processing unit 200. The processor 100A may control the main processing unit 200 to supply power to the power source sub-unit 100E via the battery unit 200C.

The switch unit 100D is configured for separately connecting with application processor 200A of the main processing unit 200 and power management unit 200B. The processor 100A may control its connection with the main processing unit 200 by controlling the opening and closing of the switch unit 100D.

The memory sub-unit 100C is configured for storing user track input to be recognized by the processor 100A.

It should be noted that the structure shown in FIG. 1 is a schematic diagram that includes the main processing unit 200 that may be similar to an existing processing unit.

Figure 2:
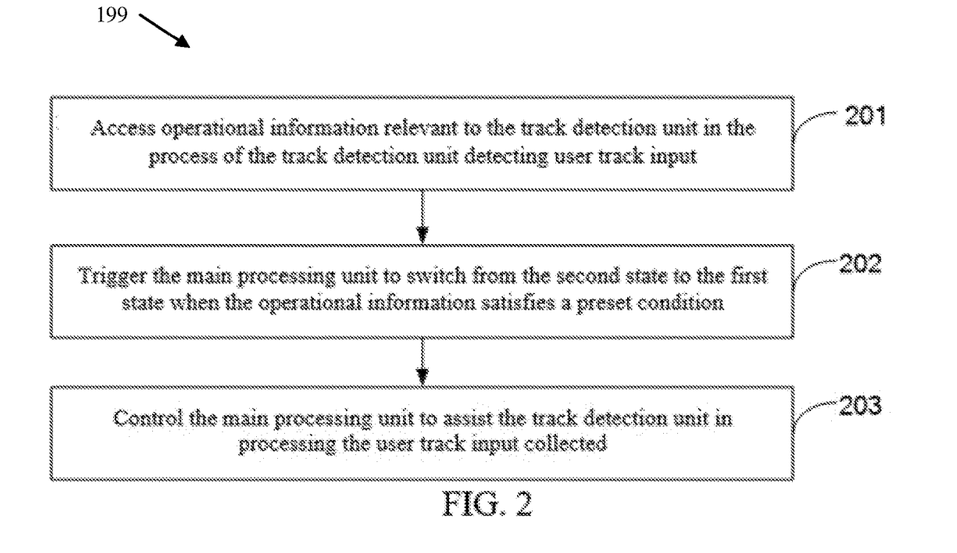
FIG. 2 is an information processing method according to Embodiment 1 of the present disclosure.

FIG. 2 is an information processing method 199 according to Embodiment 1 of the present disclosure. As illustrated in FIG. 2, the information processing method 199 includes accessing 201 operational information relevant to the track detection unit in the process of the track detection unit detecting user track input.

The track detection unit may be configured for detecting text written on the input screen of an electronic device directly or indirectly by users. For example, a user may place a piece of paper onto an electronic device, and when writing on the handwritten paper, such as by means of a stylus, the track detection unit may recognize the user track input. As another example, when a user directly uses a stylus or finger to perform sliding operations (e.g., writing) on the input screen of an electronic device, the track detection unit may recognize the user track input.

Operational information may be parameter information relevant to the working state of the track detection unit in the work process of the track detection unit detecting user track input. For example, operational information may be the current power level, storage amount, and so on.

The method 199 includes triggering 202 the main processing unit to switch from the second state to the first state when the operational information satisfies a predetermined condition.

Different types of operational information correspond to different predetermined conditions, and a predetermined condition may be a criterion for triggering the main processing unit to switch between states. For example, if the operational information does not satisfy a predetermined condition, the operational information may indicate that the track detection unit is capable of processing the user track input collected by itself. On the other hand, if the operational information satisfies a predetermined condition, the operational information may indicate that the track detection unit is currently unable or may become unable to process the user track input collected, hence the main processing unit may be used to assist the track detection unit.

In the process of the track detection unit detecting user track input, if the main processing unit is not executing other primary tasks unrelated to detecting user track input, then the main processing unit is in the second state to conserve power on the electronic device. In response to the operational information satisfying a predetermined condition, the main processing unit may be triggered to switch from the second state to the first state.

It should be noted that the above-mentioned primary tasks refer to tasks that require the main processing unit, which it can only execute while in the first state.

In the process of the track detection unit detecting user track input, if the main processing unit can complete other secondary tasks unrelated to the track detection unit while in the second state, then the main processing unit may remain in the second state to conserve the power of the electronic device. The main processing unit may be triggered to switch from the second state to the first state in response to the operational information satisfying a predetermined condition.

The method 199 includes controlling 203 the main processing unit to assist the track detection unit in processing the user track input collected.

After the main processing unit switches from the second state to the first state, the main processing unit may assist the track detection unit in processing the user track input collected.

In the present embodiment, the track detection unit is separate from the main processing unit and is used to recognize user track input. In the process of the track detection unit detecting user track input, the main processing unit may remain in the second state. Only in response to the operational information relevant to the track detection unit satisfying a predetermined condition may the main processing unit be triggered to switch from the second state to the first state to assist the track detection unit in processing the user track input collected. The power consumption of the main processing unit while in the second state is lower than the power consumption while in the first state, thereby extending the standby time of the electronic device.

In the process of the track detection unit detecting user track input, there may be circumstances in which the main processing unit assists the track detection unit in processing the user track input collected. Embodiment 2 of the present disclosure describes one specific circumstance. Specifically, in the present embodiment, Embodiment 2 includes accessing operational information relevant to the track detection unit. For example, Embodiment 2 may include accessing the current storage amount of the user track input stored in the memory sub-unit of the track detection unit.

The memory sub-unit of the track detection sub-unit may be configured for storing user track input to be recognized by the track detection unit. As the total rated storage capacity of the memory sub-unit is fixed, therefore, in order to avoid the inability to recognize user track input due to insufficient memory in the memory sub-unit, the current storage amount of the user track input stored in the memory sub-unit of the track detection unit may be accessed.

Corresponding to the memory sub-unit, the predetermined condition may be the current storage amount being larger than a predetermined storage amount. In other words, if the current storage amount is larger than the predetermined storage amount, the operational information is confirmed to have satisfied the predetermined condition, and then the main processing unit is triggered to switch from the second state to the first state. The predetermined storage amount may be set according to an actual operational situation. For example, in one embodiment, the predetermined storage amount may be 90% of the total rated storage capacity of the memory sub-unit.

Correspondingly, controlling the main processing unit to assist the track detection unit in processing the user track input collected may include controlling the main processing unit to read the user track input stored in the memory sub-unit.

Figure 3:
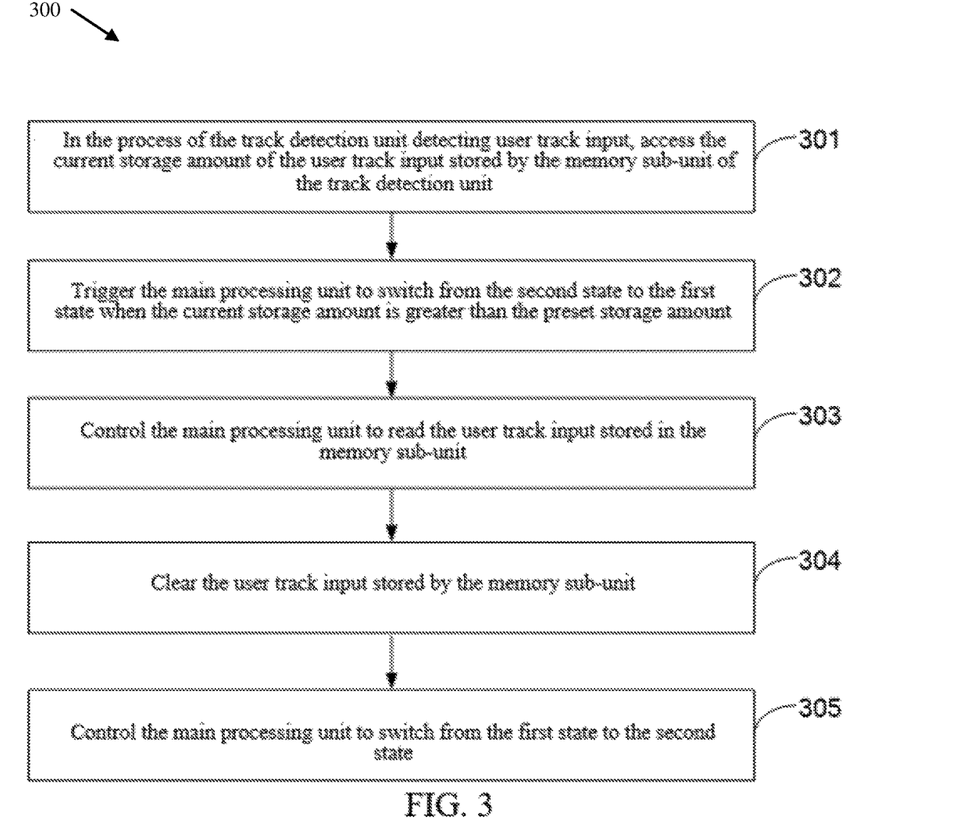
FIG. 3 is an information processing method according to Embodiment 3 of the present disclosure.

For Embodiment 2, in practical application, if the user track input stored in the memory sub-unit is always read by the main processing unit in the first state, the power consumption of electronic devices may increase. In order to reduce power consumption, Embodiment 3 of the present disclosure discloses an information processing method 300. As shown in FIG. 3, the method 300 includes, in the process of the track detection unit detecting user track input, accessing 301 the current storage amount of the user track input stored in the memory sub-unit of the track detection unit.

The method 300 also includes triggering 302 the main processing unit to switch from the second state to the first state in response to the current storage amount being larger than the predetermined storage amount.

The method 300 includes controlling 303 the main processing unit to read the user track input stored in the memory sub-unit.

The method 300 includes clearing 304 the user track input stored in the memory sub-unit.

When the main processing unit finishes reading all of the user track input stored in the memory sub-unit, the main processing unit may indicate that the user track input stored in the memory sub-unit has been backed up at the main processing unit. Therefore, the user track input stored in the memory sub-unit may be cleared.

The method 300 also includes controlling 305 the main processing unit to switch from the first state to the second state.

If the user track input stored in the memory sub-unit is cleared, the main processing unit may indicate that the memory sub-unit may continue to store user track input to be recognized by the track detection unit, and in order to reduce the power consumption of the main processing unit in the first state, the main processing unit may be controlled to switch from the first state to the second state.

Embodiment 4 of the present disclosure provides a description for another specific circumstance in which the main processing unit may assist the track detection unit in processing collected user track input.

Specifically, Embodiment 4 includes that operational information relevant to the track detection unit is accessed. Specifically, the current power level of the power source sub-unit of the track detection unit is accessed.

The power source sub-unit of the track detection sub-unit may be configured for supplying power in the process of the track detection unit detecting user track input. Therefore, in order to avoid interruption to the process of detection by the track detection unit as a result of the power level of the power source sub-unit being too low, the current power level of the power source sub-unit of the track detection unit may be accessed.

Corresponding to the power source sub-unit, the predetermined condition may be that the current power level is lower than the predetermined first power level, that is, if the current power level is lower than the predetermined first power level, the operational information may satisfy the predetermined condition, and then the main processing unit may be triggered to switch from the second state to the first state. The predetermined first power level may be set according to an actual operational situation. For example, the predetermined first power level may be 10% of the total rated power level of the power source sub-unit.

In certain embodiments, controlling the main processing unit to assist the track detection unit in processing the collected user track input may include controlling the main processing unit to supply power to the power source sub-unit.

Figure 4:
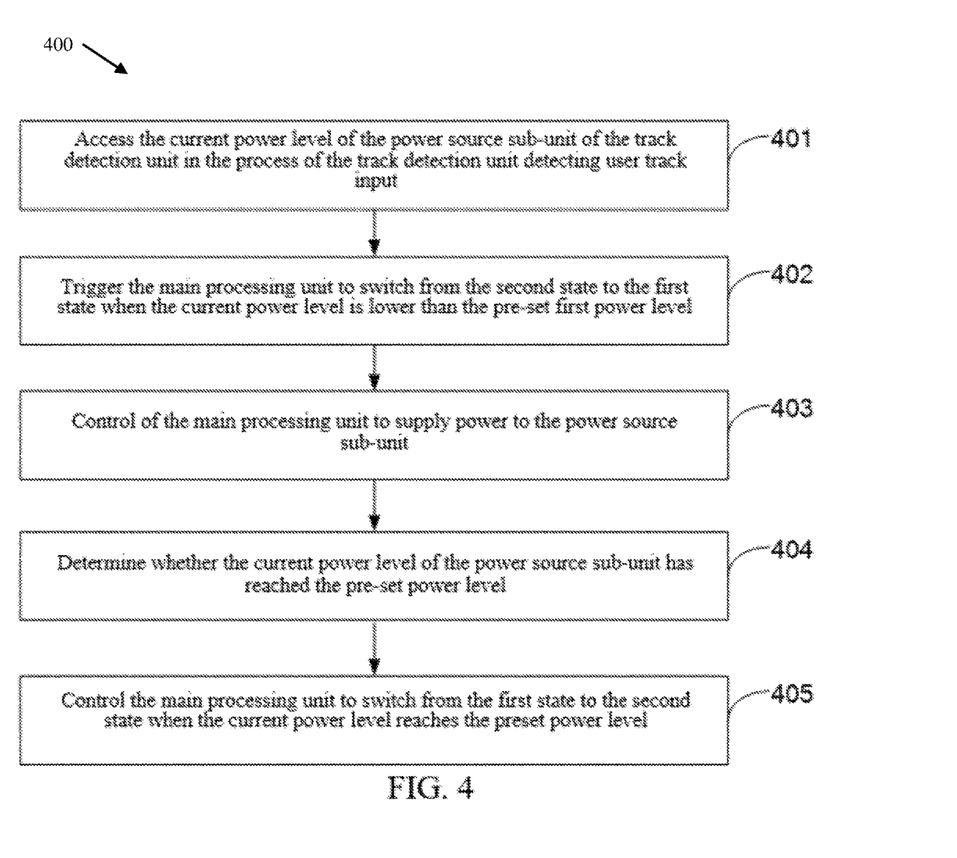
FIG. 4 is an information processing method according to Embodiment 5 of the present disclosure.

For Embodiment 4, in certain applications, if power is always supplied to the power source sub-unit by the main processing unit in the first state, then the power consumption of electronic devices may increase. Therefore, Embodiment 5 of the present disclosure discloses an information processing method that may be used to reduce power consumption. As shown in FIG. 4, a method 400 includes accessing 401 the current power level of the power source sub-unit of the track detection unit in the process of the track detection unit detecting user track input.

The method 400 includes, if the current power level is lower than the predetermined first power level, triggering 402 the main processing unit to switch from the second state to the first state.

The method 400 also includes controlling 403 the main processing unit to supply power to the power source sub-unit.

The method 400 includes determining 404 whether the current power level of the power source sub-unit has reached the predetermined power level.

The predetermined power level may be set according to an actual operational situation. For example, the predetermined power level may be 85% of the total rated power level of the power source sub-unit.

By determining whether the current power level of the power source sub-unit has reached the predetermined power level, it may be determined whether the power source sub-unit has sufficient power to supply to the track detection unit in the process of detecting user track input. In response to the current power level of the power source sub-unit not reaching the predetermined power level, the main processing unit will continue to supply power to the power source sub-unit.

The method 400 includes controlling 405 the main processing unit to switch from the first state to the second state in response to the current power level reaching the predetermined power level.

If the current power level of the power source sub-unit reaches the predetermined power level, the main processing unit indicates that the power source sub-unit may provide sufficient power to the track detection unit. Therefore, in order to reduce the power consumption of the main processing unit, the main processing unit may be controlled to switch from the first state to the second state.

In certain applications, before starting to recognize user track input, the track detection unit may be in a ready-to-recognize state. In certain conditions, the track detection unit may increase the power consumption of electronic devices while in a ready-to-recognize state. Embodiment 6 of the present disclosure discloses an information processing method to be applied in electronic devices comprising at least a track detection unit and a main processing unit to facilitate reducing power consumption.

In certain embodiments, the track detection unit may be used in conjunction with a stylus, the track detection unit may have a third state and a fourth state, the power consumption of the track detection unit while in the fourth state may be lower than the power consumption of the track detection unit while in the third state, and the track detection unit is in the fourth state before starting to recognize user track input.

It should be noted that the track detection unit may be unable to recognize user track input while in the fourth state and the track detection unit may be able to recognize user track input only while in the third state (the ready-to-recognize state).

Figure 5:
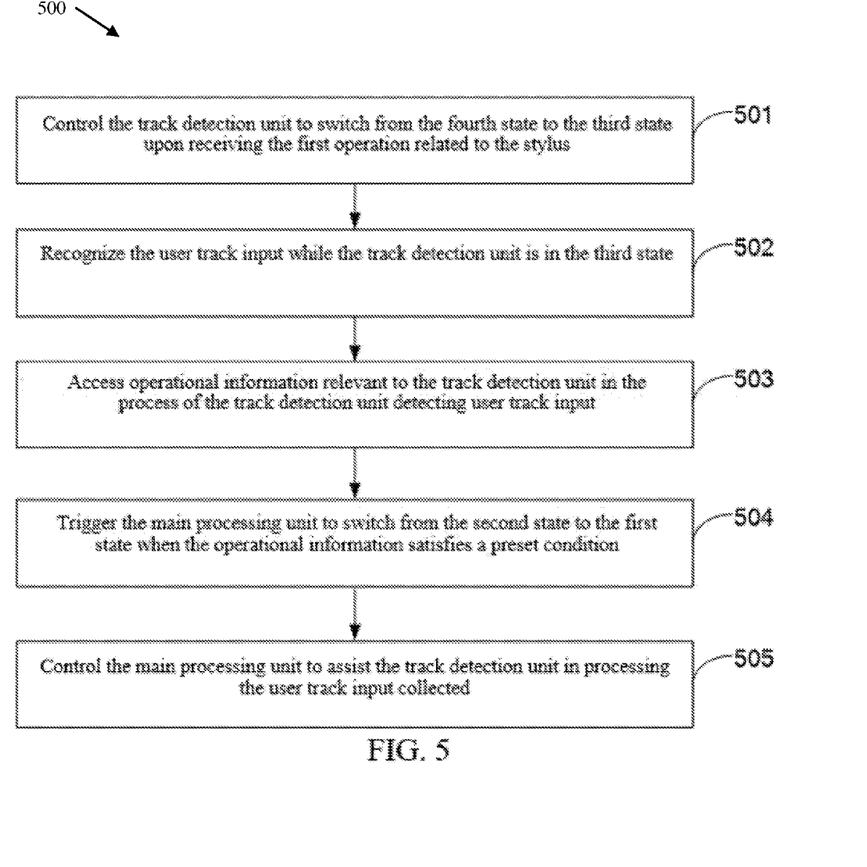
FIG. 5 is an information processing method according to Embodiment 6 of the present disclosure.

As shown in FIG. 5, an information processing method 500 includes controlling 501 the track detection unit to switch from the fourth state to the third state upon receiving a first operation related to the stylus.

In this embodiment, a user may write on the input screen of an electronic device by means of (e.g., using) a stylus. However, before using the stylus to write, a first operation related to the stylus can be triggered, so that the track detection unit enters the ready-to-recognize phase.

Specifically, the triggering of the first operation related to the stylus may be implemented in many ways. In one embodiment, a first button may be arranged on the stylus, and if the user triggers the first button, the electronic device receives the first operation related to the stylus. In another embodiment, a stylus holder may be arranged on the electronic device to recognize whether the stylus is fixed in the stylus holder, so if the user removes the stylus from the stylus holder, the electronic device receives the first operation related to the stylus.

The method 500 also includes recognizing 502 the user track input while the track detection unit is in the third state. The track detection unit is able to recognize user track input while in the third state.

The method 500 includes accessing 503 operational information relevant to the track detection unit in the process of the track detection unit detecting user track input.

The method 500 also includes triggering 504 the main processing unit to switch from the second state to the first state when the operational information satisfies a predetermined condition.

The method 500 includes controlling 505 the main processing unit to assist the track detection unit in processing the user track input collected.

In the present embodiment, because the track detection unit is in the fourth state before starting to recognize user track input, and the power consumption of the track detection unit while in the fourth state is lower than the power consumption while in the third state, power consumption of the electronic devices may be reduced relative to other configurations.

Embodiment 7 of the present disclosure includes an electronic device. The electronic device may be a mobile phone, a tablet computer, a PAD, or the like.

The electronic device includes at least a track detection unit and a main processing unit. The main processing unit has at least a first state and a second state, and the power consumption of the main processing unit while in the second state is lower than the power consumption while in the first state.

It should be noted that the track detection unit may only be a small processing system. The power consumption of the track detection unit while in the working state may be much lower than the power consumption of the main processing unit while in the first state. Therefore, in the present disclosure, the detection of user track input may be performed by the track detection unit. In the process of the track detection unit detecting user track input, the main processing unit may be in the second state.

In the present disclosure, the track detection unit may be connected with the main processing unit. Specifically, the track detection unit may be implemented in many ways. For a specific implementation, refer to the embodiment that FIG. 1 corresponds to.

Figure 6:
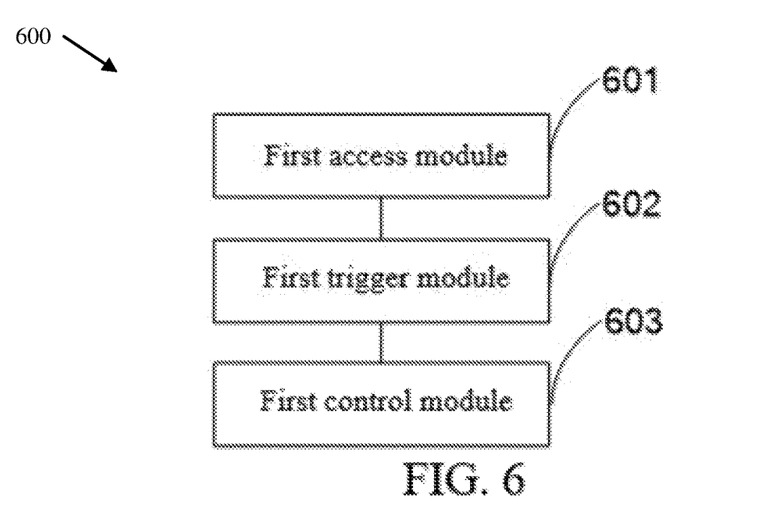
FIG. 6 is an electronic device according to Embodiment 7 of the present disclosure.

As shown in FIG. 6, an electronic device 600 includes a first access module 601, a first trigger module 602, and a first control module 603.

The first access module 601 may be configured for accessing operational information relevant to the track detection unit in the process of the track detection unit detecting user track input.

The first trigger module 602 may be configured for triggering the main processing unit to switch from the second state to the first state in response to the operational information satisfying a predetermined condition.

The first control module 603 may be configured for controlling the main processing unit to assist the track detection unit in processing the user track input collected.

In the present embodiment, the track detection unit separate from the main processing unit may be used to recognize user track input, and in the process of the track detection unit detecting user track input, the main processing unit may remain in the second state. In response to the operational information relevant to the track detection unit satisfying a predetermined condition, the main processing unit may be triggered to switch from the second state to the first state to assist the track detection unit in processing the user track input collected. The power consumption of the main processing unit while in the second state may be lower than the power consumption while in the first state, thereby extending the standby time of the electronic device.

Embodiment 8 of the present disclosure discloses a specific implementation of the first access module. In this embodiment, the first access module may be specifically configured for accessing, in the process of the track detection unit detecting user track input, the current storage amount of the user track input stored in the memory sub-unit of the track detection unit.

The predetermined condition may be the current storage amount being larger than the predetermined storage amount. In other words, in response to the current storage amount being larger than the predetermined storage amount, the operational information may be confirmed to have satisfied the predetermined condition, and then the main processing unit may be triggered to switch from the second state to the first state. The predetermined storage amount may be set according to an actual operational situation. For example, the predetermined storage amount may be 90% of the total rated storage capacity of the memory sub-unit.

In certain embodiments, the first control module may be specifically for controlling the main processing unit to read the user track input stored in the memory sub-unit.

Figure 7:
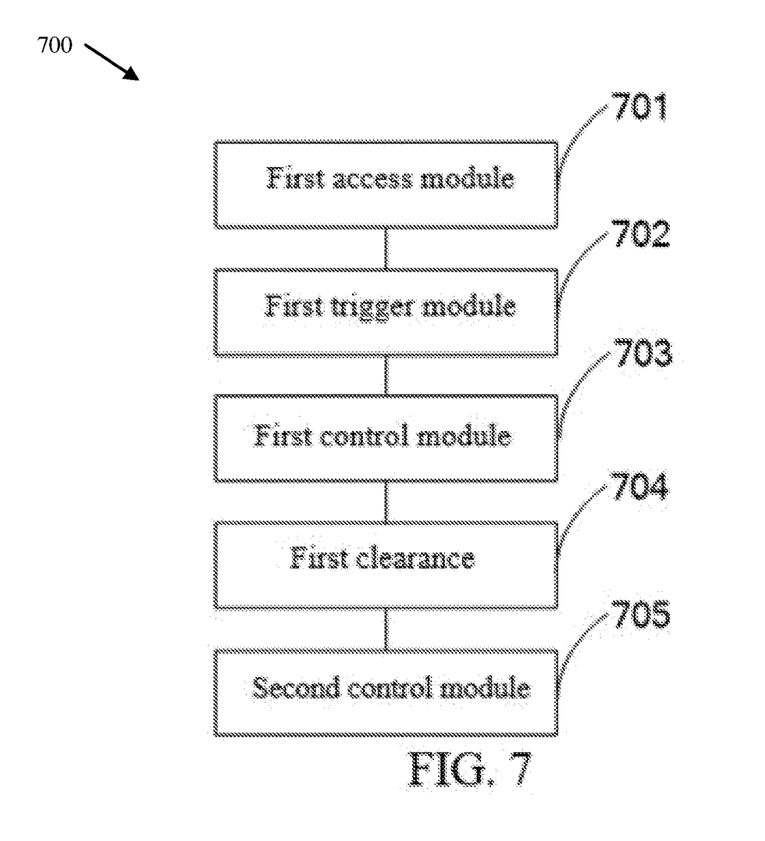
FIG. 7 is a structural schematic diagram of an electronic device according to Embodiment 9 of the present disclosure.

Embodiment 9 of the present disclosure discloses an electronic device 700. As shown in FIG. 7, the electronic device 700 includes a first access module 701, a first trigger module 702, a first control module 703, a first clearance module 704, and a second control module 705.

The first access module 701 is configured for accessing, in the process of the track detection unit detecting user track input, the current storage amount of the user track input stored in the memory sub-unit of the track detection unit The first trigger module 702 is configured for triggering the main processing unit to switch from the second state to the first state in response to the current storage amount being larger than the predetermined storage amount.

The first control module 703 is configured for controlling the main processing unit to read the user track input stored in the memory sub-unit.

The first clearance module 704 is configured for clearing the user track input stored in the memory sub-unit.

When the main processing unit finishes reading all of the user track input stored in the memory sub-unit, the main processing unit indicates that the user track input stored in the memory sub-unit has been backed up at the main processing unit. Therefore, the user track input stored in the memory sub-unit may be cleared.

The second control module 705 is configured for controlling the main processing unit to switch from the first state to the second state.

When the user track input stored in the memory sub-unit is cleared, the main processing unit indicates that the memory sub-unit may continue to store user track input to be recognized by the track detection unit, in order to reduce the power consumption of the main processing unit in the first state, the main processing unit may be controlled to switch from the first state to the second state.

Embodiment 10 of the present disclosure discloses another implementation of the first access module. In this embodiment, the first access module may be configured to access the current power level of the power source sub-unit of the track detection unit in the process of the track detection unit detecting user track input.

The predetermined condition may be that the current power level is lower than the predetermined first power level, that is, in response to the current power level being lower than the predetermined first power level, the operational information may have satisfied the predetermined condition, and then the main processing unit may be triggered to switch from the second state to the first state. The predetermined first power level may be set according to an actual operational situation. For example, the predetermined first power level may be 10% of the total rated power level of the power source sub-unit.

In certain embodiments, the first control module is configured for controlling the main processing unit to supply power to the power source sub-unit.

Figure 8:
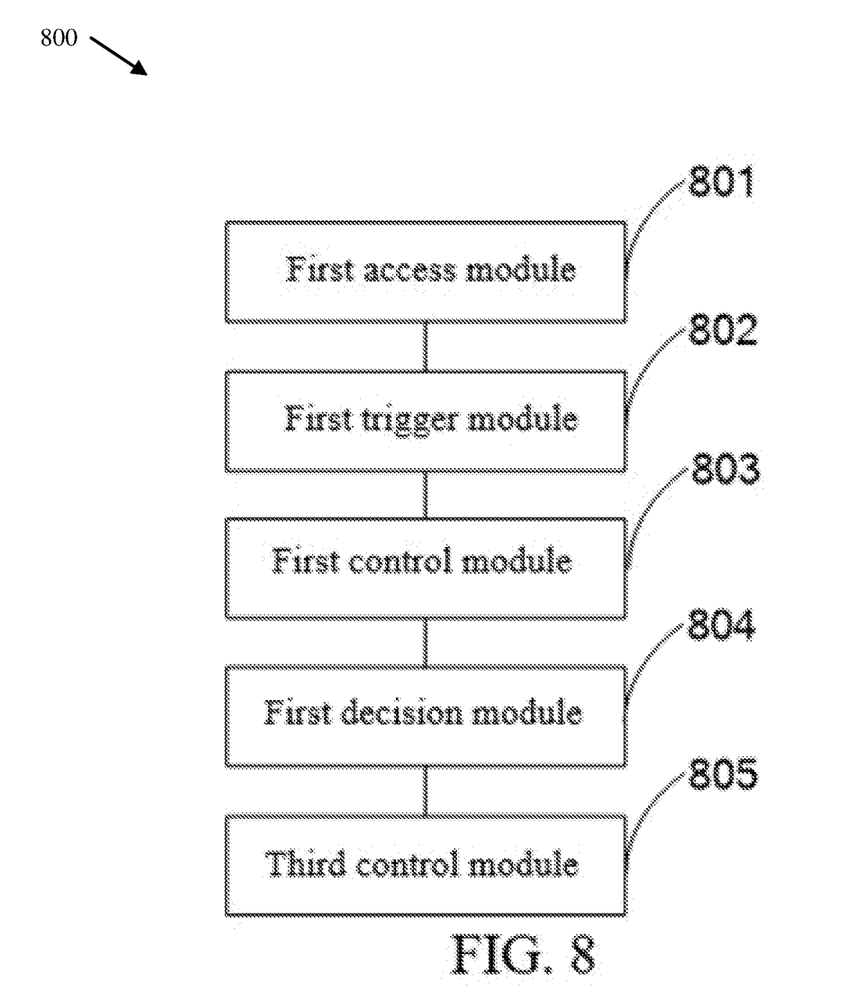
FIG. 8 is a structural schematic diagram of an electronic device according to Embodiment 11 of the present disclosure.

Embodiment 11 of the present disclosure discloses an electronic device 800. As shown in FIG. 8, the electronic device 800 includes a first access module 801, a first trigger module 802, a first control module 803, a first decision module 804, and a third control module 805.

The first access module 801 is configured for accessing the current power level of the power source sub-unit of the track detection unit in the process of the track detection unit detecting user track input.

The first trigger module 802 is configured for triggering the main processing unit to switch from the second state to the first state in response to the current power level being lower than the predetermined first power level.

The first control module 803 is configured for controlling the main processing unit to supply power to the power source sub-unit.

The first decision module 804 is configured for determining whether the current power level of the power source sub-unit has reached the predetermined power level.

The predetermined power level may be set according to the actual situation. For example, the predetermined power level may be 85% of the total rated power level of the power source sub-unit.

By determining whether the current power level of the power source sub-unit has reached the predetermined power level, it may be confirmed whether the power source sub-unit has sufficient power to supply to the track detection unit in the process of detecting user track input. In response to the current power level of the power source sub-unit not reaching the predetermined power level, the main processing unit may continue to supply power to the power source sub-unit.

The third control module 805 is configured for controlling the main processing unit to switch from the first state to the second state in response to the current power level reaching the predetermined power level.

In response to the current power level of the power source sub-unit reaching the predetermined power level, the main processing unit may indicate that the power source sub-unit may provide sufficient power to the track detection unit. Therefore, in order to reduce the power consumption of the main processing unit in the first state, the main processing unit may be controlled to switch from the first state to the second state.

Embodiment 12 of the present disclosure discloses an electronic device. The electronic device includes at least a track detection unit and a main processing unit.

In this embodiment, the track detection unit may be used in conjunction with a stylus, the track detection unit may have a third state and a fourth state, the power consumption of the track detection unit while in the fourth state may be lower than the power consumption of the track detection unit while in the third state, and the track detection unit may be in the fourth state before starting to recognize the user track input.

It should be noted that the track detection unit is unable to recognize user track input while in the fourth state, and the track detection unit is able to recognize user track input only while in the third state (the above-mentioned ready-to-recognize state).

Figure 9:
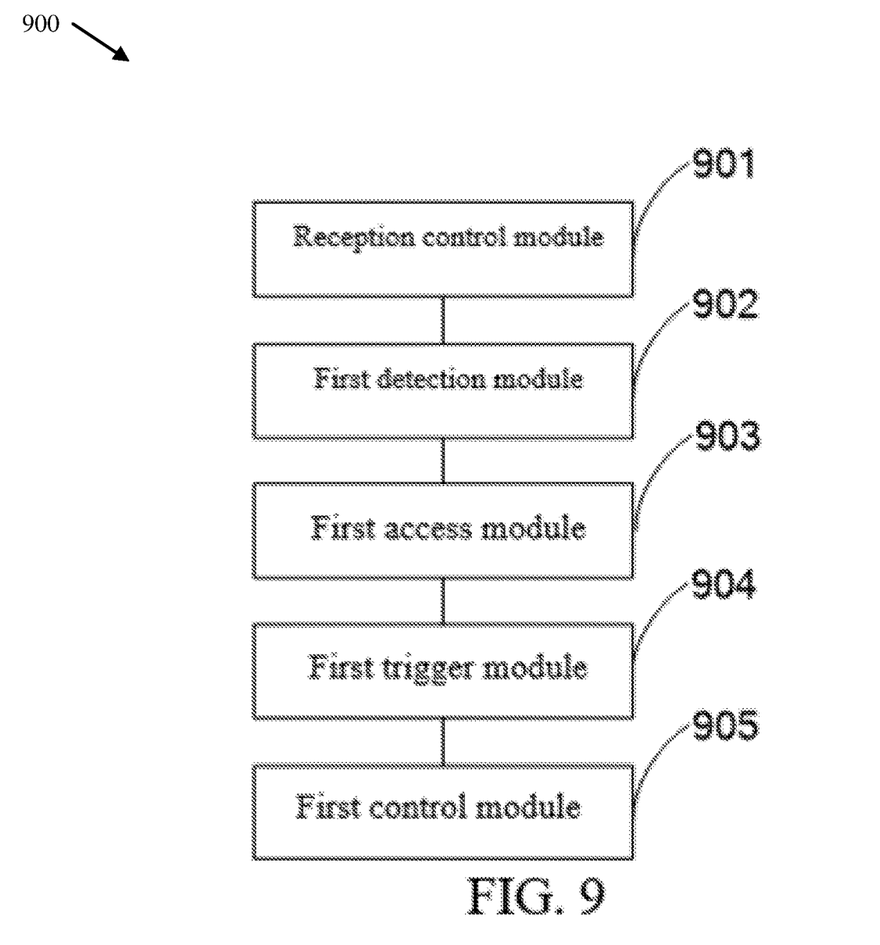
FIG. 9 is a structural schematic diagram of an electronic device according to Embodiment 12 of the present disclosure.

As shown in FIG. 9, an electronic device 900 includes a control device 901, a first detection module 902, a first access module 903, a first trigger module 904, and a first control module 905.

The control device 901 is configured for controlling the track detection unit to switch from the fourth state to the third state upon receiving the first operation related to the stylus, in response to the control device 902 being activated by a user.

Specifically, the triggering of the first operation related to the stylus may be implemented in many ways. In one embodiment, a first button may be arranged on the stylus, and, when the user triggers the first button, the electronic device 900 receives the first operation related to the stylus. In another embodiment, a stylus holder may be arranged on the electronic device 900 to recognize whether the stylus is fixed in the stylus holder, so that when the user removes the stylus from the stylus holder, the electronic device 900 receives the first operation related to the stylus.

The first detection module 902 is configured for detecting the user track input when the track detection unit is in the third state.

The first access module 903 is configured for accessing operational information relevant to the track detection unit in the process of the track detection unit detecting user track input.

The first trigger module 904 is configured for triggering the main processing unit to switch from the second state to the first state in response to the operational information satisfying a predetermined condition.

The first control module 905 is configured for controlling the main processing unit to assist the track detection unit in processing the collected user track input.

In the present embodiment, because the track detection unit is in the fourth state before starting to recognize user track input, and the power consumption of the track detection unit while in the fourth state is lower than the power consumption of the track detection unit while in the third state, the power consumption of the electronic device 900 may be reduced.

Each embodiment of a device corresponds to an embodiment of a method above. Please refer to the embodiments of methods for the specifics, as they will not be described herein in detail.

The embodiments in this specification have been described in a progressive manner. What is emphasized in each embodiment is its differences from other embodiments. Identical or similar features across the embodiments can be identified by cross referencing. For the devices disclosed in the embodiments, the descriptions are relatively brief as they correspond to the methods disclosed in the embodiments. Please refer to the description of the methods for relevant points.

Those skilled in the art should be able to implement or apply the present disclosure upon reviewing the description of the embodiments disclosed above. It will be obvious to those skilled in the art that there may be many possible modification to these embodiments, and the general principles defined herein may be implemented in other embodiments without departing from the essence or scope of the present disclosure. Therefore, the present disclosure is not limited to the embodiments shown herein, but accords with the broadest scope consistent with the principles and novel features disclosed herein.

What is claimed is:

1. An electronic device, comprising:
   a processor comprising a first state and a second state, the processor consuming more power in the first state than in the second state; and
   a track detection unit that detects a user track input, wherein operational information of the track detection unit is determined as the track detection unit detects the user track input, and, in response to the determined operational information of the track detection unit satisfying a predetermined condition, the processor switches from operating in the second state to operating in the first state, and wherein the operational information indicates that the track detection unit is capable of processing the user track input collected in response to the operational information not satisfying the predetermined condition, wherein the operational information comprises a storage amount of the track detection unit that stores the detected user track input, a current power consumption of the track detection unit, or a combination thereof.

2. The electronic device of claim 1, wherein the first state of the processor is an ON state and the second state of the processor is an OFF state.

3. The electronic device of claim 1, wherein the predetermined condition comprises the storage amount of the track detection unit exceeding a predetermined storage amount.

4. The electronic device of claim 1, wherein the predetermined condition comprises the current power consumption of the track detection unit being lower than a predetermined power consumption.

5. The electronic device of claim 1, wherein the processor in the first state:
   accesses a current storage amount of the user input stored in the memory of the track detection unit as the track detection unit detects user input; and
   reads the user input stored in the memory.

6. The electronic device of claim 5, wherein the processor further:
   clears the user input stored in the memory; and
   switches from the first state to the second state.

7. The electronic device of claim 1, wherein the processor in the first state:
   accesses a current power level of a power source of the track detection unit as the track detection unit detects the user input; and
   supplies power to the power source.

8. The electronic device of claim 7, wherein the processor further:
   determines whether the current power level of the power source has reached a predetermined power level; and
   switches from the first state to the second state in response to the current power level reaching a predetermined power level.

9. The electronic device of claim 1, wherein the track detection unit comprises a third state and a fourth state, the track detection unit requiring more power in the third state than in the fourth state, and the electronic device further comprises:
   a control device that switches the track detection unit from the fourth state to the third state in response to user activation; and
   the track detection unit detects a user track input in the third state.

10. The electronic device of claim 9, further comprising a stylus used in conjunction with the track detection unit, wherein the control device is arranged on the stylus.

11. A method, comprising:
    detecting a user track input using a track detection unit;
    determining operational information of the track detection unit as the track detection unit is detecting the user track input; and
    in response to the determined operating information of the track detection unit satisfying a predetermined condition, switching a processor from a second state to a first state, wherein the processor requires more power in the first state than in the second state, and wherein the operational information indicates that the track detection unit is capable of processing the user track input collected in response to the operational information not satisfying the predetermined condition, wherein the operational information comprises a storage amount of the track detection unit that stores the detected user track input, a current power consumption of the track detection unit, or a combination thereof.

12. The method of claim 11, wherein determining operational information of the track detection unit comprises:
    accessing a current storage amount of the user track input stored in a memory of the track detection unit; and
    controlling the processor to assist the track detection unit in processing the user track input by controlling the processor to read the user track input stored in the memory.

13. The method of claim 12, wherein after controlling the processor to read the user track input stored in the memory, the method further comprises:
   clearing the user track input stored in the memory; and
   controlling the processor to switch from the first state to the second state.

14. The method of claim 11, wherein determining operational information of the track detection unit comprises:
   accessing a current power level of a power source of the track detection unit; and
   controlling the processor to assist the track detection unit in processing the user track input by controlling the processor to supply power to the power source.

15. The method of claim 14, wherein controlling the processor to supply power to the power source further comprises:
   determining whether the current power level of the power source has reached a predetermined power level; and
   controlling the processor to switch from the first state to the second state in response to the current power level reaching the predetermined power level.

16. The method of claim 11, further comprising:
   switching the track detection unit from a third state and a fourth state using a control device, wherein the track detection unit requires more power in the third state than in the fourth state; and
   detecting a user track using the track detection unit in the third state.

* * * * *